United States Patent [19]

Bradshaw

[11] Patent Number: 4,559,971
[45] Date of Patent: Dec. 24, 1985

[54] SINGLE COIL VACUUM/VENT VALVE

[75] Inventor: Cyril E. Bradshaw, Wheaton, Ill.

[73] Assignee: Eaton Corporation, Cleveland, Ohio

[21] Appl. No.: 694,909

[22] Filed: Jan. 25, 1985

Related U.S. Application Data

[63] Continuation of Ser. No. 468,246, Feb. 22, 1983, abandoned.

[51] Int. Cl.[4] .............................................. F15B 13/044
[52] U.S. Cl. .................................. 137/596.17; 137/870; 251/65; 251/129.01
[58] Field of Search ..................... 137/596.17, 870; 251/65, 141

[56] References Cited

U.S. PATENT DOCUMENTS

| | | | |
|---|---|---|---|
| 3,842,860 | 10/1974 | Stampfli | 137/596.17 |
| 4,190,618 | 2/1980 | Sheffer | 251/65 X |
| 4,306,589 | 12/1981 | Harned et al. | 251/141 X |
| 4,322,057 | 3/1982 | Yamanaka et al. | 251/141 X |

FOREIGN PATENT DOCUMENTS

| | | |
|---|---|---|
| 1084096 | 6/1960 | Fed. Rep. of Germany ...... 137/870 |
| 1157868 | 11/1963 | Fed. Rep. of Germany ...... 137/596.17 |
| 1559373 | 1/1980 | United Kingdom . |
| 1591471 | 6/1981 | United Kingdom . |
| 1594578 | 7/1981 | United Kingdom . |

Primary Examiner—Gerald A. Michalsky
Attorney, Agent, or Firm—C. H. Grace; R. A. Johnston

[57] ABSTRACT

A no-flow vacuum control signal valve (10, 60) employing a single solenoid coil (34, 116) having a stationary ferromagnetic core (40, 68) and moveable permanent magnet armatures (46, 48, 100, 108) disposed adjacent the opposite ends of said core. The permanent magnet armatures function as individual valve poppets for individually opening and closing a vacuum vent port (18, 96) and a vacuum source port (28, 88) communicating with a valving chamber (14, 78, 80). A spring (50, 52, 104, 112) biases each poppet closed such that no fluid flows when the coil is not energized. Upon pulsing with current of one polarity of the coil, the vent port remains closed and the vacuum source port is opened. Upon pulsing of the coil with current of reverse polarity, the vent port is opened and the vacuum source port remains closed. The valving chamber has a third fluid signal port (32, 98) adopted for connection thereto for control signal output.

5 Claims, 3 Drawing Figures

SINGLE COIL VACUUM/VENT VALVE

This application is a continuation of application Ser. No. 468,246, filed Feb. 22, 1983, now abandoned.

BACKGROUND OF THE INVENTION

The present invention relates to electrically operated valves for use in providing a fluid pressure control signal. In particular, the invention relates to electromagnetically actuated valves for providing a variable vacuum signal for use in controlling a fluid pressure servoactuator in response to an electrical control signal.

In automotive engine and accessory control systems, it has been found particularly convenient to employ engine developed vacuum as a source of fluid pressure for operating vacuum servoactuators or motors for various engine control functions. However, as automotive engines have decreased in displacement in the interests of reducing weight and fuel consumption, the amount of vacuum available for accessories has substantially diminished.

Heretofore, on-board vacuum control systems have employed electrically operated control valves which, during periods of control operation, provided for valve actuation between a vacuum supply port and an atmospheric venting orifice in a manner analogous to a single-pole double-throw switch. In such arrangements, an electrical coil moved an armature-valve member between one position opening a vent port and closing a vacuum port and another position closing the vent port and opening the vacuum port. This known valving arrangement thus resulted in a continuous flow of atmospheric air or vent bleed into the engine valving chamber and thus to the vacuum source.

It has also known to employ dual electrical coils for individually actuating a vacuum and vent valve poppet member in response to electrical control signals. Such dual coil valve arrangements have necessarily resulted in bulkiness of the control valve and increased manufacturing costs in providing two electrical coils and the associated electrical connections thereto.

The aforementioned dual coil vacuum control valve, also provides continuous flow of atmospheric air to the valving chamber which reduces the engine manifold vacuum and drains engine power.

Thus, it has long been desired to find a way or means of providing a vacuum control signal in response to an electrical input control signal and provide such a function without causing continuous bleed of atmospheric air into the vacuum source.

Furthermore, it has been desired to provide such a control valve which is electrically operated by a single coil and yet provides a control signal by alternately applying vacuum and venting a control signal pressure chamber without permitting continuous bleed of atmospheric air to the vacuum source.

It is known in the solenoid art to utilize a permanently magnetized armature in association with the magnetic forces generated by current flow in an electrical coil. Examples of such devices are described and shown in the periodical "Machine Design", Volume 52, Aug. 21, 1980 Issue at page 42 published by Penton Publishing Company, Cleveland, Ohio. The use of a permanent magnet armature for an electromagnetically actuated device permits short current pulses to latch the armature. Movement of the armature in an opposite direction for latching is accomplished by short current pulses of opposite polarity.

Thus it has been desired to find a way of using electromagnetic actuation to actuate and hold a control valve for providing a vacuum control signal in response to an electrical signal applied to a single coil and yet provide such control signal without permitting continuous vent flow through the valve to the engine vacuum source.

SUMMARY OF THE INVENTION

The present invention relates to a vacuum signal control valve in use in automotive engine accessory control systems where an on-board source of vacuum is applied to a vacuum servoactuator for effecting movement of a control member. The control valve is electrically operated and adapted to be controlled from a low current signal as, for example, a series of current pulses made available from low voltage solid state switching circuitry.

The present invention provides a solution to the above-described problem by employing a single electrical coil having a stationary iron core which upon energization of the coil by current pulses of a given polarity creates opposite magnetic poles at the ends of the core. Individual moveable permanently magnetized armatures are disposed adjacent to both ends of the coil core and one armature is repelled while the other attracted. The permanent magnet armature which is attracted is latched to the core end by pulsing the coil with a given polarity. Reversing the current pulse-polarity reverses the order of repulsion and attraction for the permanently magnetized armatures. The armatures are both spring biased in a direction away from the coil core and toward, respectively, a vacuum vent and vacuum supply port seat. When the coil is deenergized both armature-poppets are seated thereby closing the ports to the valving chamber and no bleed flow is permitted to the vacuum source.

The present invention thus provides a novel electrically energized control valve employing a single coil which, upon electrical energization of the coil by current pulses of desired polarity, provides a varying fluid pressure control signal in a valving chamber. The invention is described with respect to the particular negative fluid pressure, or vacuum application. When the coil is not energized both the vacuum supply and vent ports to the valving chamber are closed and thus the valve prevents atmospheric bleed through to the vacuum source when a period of dwell is encountered and no variation is required in the vacuum control signal.

The valve of the present invention requires no holding current in the coil during periods of dwell and thus is energizable by a low power electrical control signal. The present value thus provides a unique and novel solution to the problem of providing a low cost single coil electrically actuated vacuum control valve capable of being operated by low voltage current pulses from solid state circuitry and which does not cause continuous vent-bleed of atmospheric air to the vacuum source.

DETAILED DESCRIPTION

Figure 1:
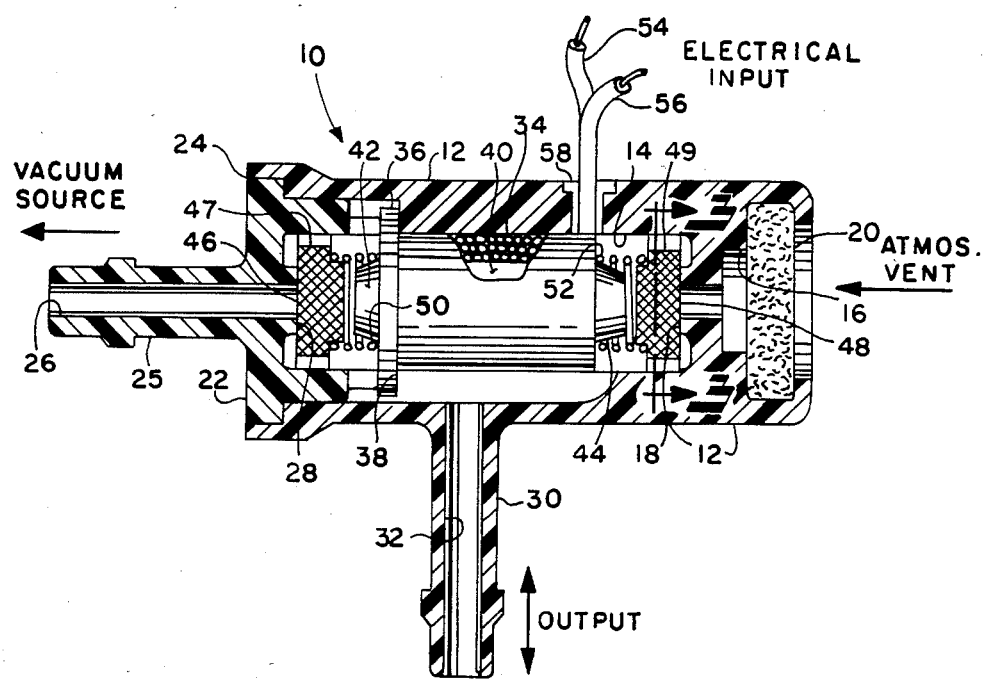
FIG. 1 is a cross-sectional view taken along the electrical coil axis of the control valve of the present invention; and, FIG. 2 is a view similar to FIG. 1 with a portion of the section view rotated and illustrates an alternate embodiment of the valve.

Referring now to FIG. 1, the valve assembly of the present invention is indicated generally at 10 as having a housing means formed of a main portion 12 having a generally cylindrical configuration with a valving cavity 14 formed therein. An atmospheric vent passage 16 is formed in one end thereof the housing and intersects the wall of cavity 14 in the form of an annular vent valve seat 18. Passage 16 communicates with the atmosphere via a suitable dust filter 20 retained in the right-hand end of the housing portion 12.

The valving chamber 14 is closed on the left-hand end by a cap portion 22 of the housing means which is received in the main portion 12 and sealed about the parting line 24 by any suitable expedient as, for example, weldment. Cap portion 22 has an outwardly extending vacuum connector portion 25 formed thereon which is adapted for connection to a vacuum source hose. Connector 25 has a vacuum inlet passage 26 extending therethrough which intersects the wall of the chamber 14 in an annular vacuum valve seat 28. In the presently preferred practice of invention, the annular valve seats 18, 28 are axially aligned and disposed at opposite ends of the valving chamber.

The wall of the main housing portion 12 has extending therefrom, intermediate the ends thereof, a connector 30 which is adapted for connection to an output control signal hose. The connector 30 has an output control signal passage 32 provided therethrough which is ported to the valving chamber 14.

An electrical coil 34 is received in the valving chamber 14 and is wound on a bobbin having flange 36 provided on one thereof for registering against a shouldered surface 38 provided in the wall of the valving chamber 14.

The coil 34 has a core 40 formed of ferromagnetic material, or material of high magnetic permeability, received therein with the ends 42, 44 thereof extending preferably beyond the ends of the coil 34.

A vacuum source valve poppet 46 is received in the valving chamber and disposed for movement between the vacuum source valve seat 28 and the end 42 of the coil core. Similarly, a vent valve poppet 48 is received in the valving chamber 14 and disposed intermediate the vent valve seat 18 and coil core end 44.

Figure 3:
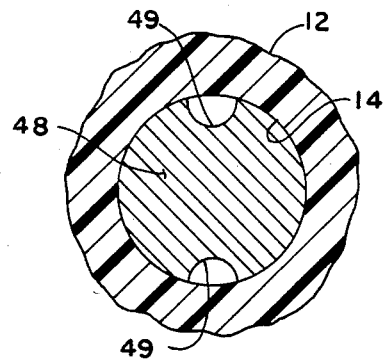
FIG. 3 is a section taken along lines 3—3 of FIG. 1.

In the embodiment of FIG. 1, a compression spring 50 biases the vacuum poppet 46 leftward into contact with the vacuum valve seat 28. A corresponding compression spring 52 biases the vent valve poppet 48 rightward into contact with the vent valve seat 18. As shown typically in FIG. 3, for the poppet 48, both poppets 46; 48 have their periphery guided by bore 14 and have cut-outs 49 to provide fluid pressure communication around the poppet for communicating the valve seat 18, 20 with the output port 32 for proper valve function.

The valve poppets 46, 48 comprise permanent magnets axially polarized in the direction of poppet movement. The poppets 46, 48 are disposed with like poles adjacent the ends 42, 44 of the coil core and as hereinafter described function as moveable armatures upon electrical energization of the coil.

A pair of suitable electrical leads 54, 56 pass through the wall of the housing portion 12 and are sealed by a suitable grommet 58 thus providing means for external electrical connection to the coil.

In operation, a series of current pulses, of predetermined polarity, are applied to the coil leads 54, 56 and the resultant current flow in coil 34 creates magnetic poles of opposite polarity in the ends 42, 44 of the coil core. The polarity of the current is chosen such that the respective adjacent end 42 or 44 of the coil core is of like polarity with the desired one of the poppets 46, 48 which is thus repelled by the magnetomotive force developed. The magnetomotive force sums with the bias of the spring to maintain the poppet closed against the respective adjacent valve seat.

For a given current polarity, the opposite one of the ends 42, 44 of the coil core has an opposite polarity with respect to the permanent magnet poppet adjacent thereto. The adjacent poppet of opposite polarity is attracted to the core end by the sum of the forces of the permanently magnetized poppet and the magnetic force of attraction generated in the core end by current flow and the resultant magnetomotive force is sufficient to overcome the bias of the spring and move the poppet away from its respective adjacent valve seat. Upon the poppet contacting the core end, the poppet is magnetically latched against the end of the core. Upon cessation of the current flow in the coil, the force of magnetic attraction of the permanent magnet alone is insufficient to overcome the force bias of the spring for maintaining the poppet magnetically latched against the core and the open poppet is returned to contact its valve seat.

If a series of current pulses of reverse polarity is applied to the coil, the polarity of the chosen one of the coil core ends 42, 44 will be reversed. Thus, the reversing the port opening of the valve. It will be understood that either valve poppet may be opened by the application of electrical current pulses of the appropriate polarity to the valve coil. The choice of which poppet is to be opened is thus determined by the choice polarity of the coil current.

It will be seen, however, that irrespective of the polarity of the coil current for a given polarity, only one poppet is moved away from its seat when current flows in the coil; and, the other poppet is maintained in the closed position.

The resultant "EITHER-OR" operation of the valve poppets of the present invention prevents flow of atmospheric bleed air through the valving chamber to the vacuum source when the control signal is operable to vary the pressure in the chamber 14 for varying the output control signal.

It will be understood that by varying the width of the pulses, the open time of the individual poppets may be varied for controlling the rate of vacuum increase or decay within the valving chamber to thus give the valve the vacuum control signal response at the desired rate.

Figure 2:
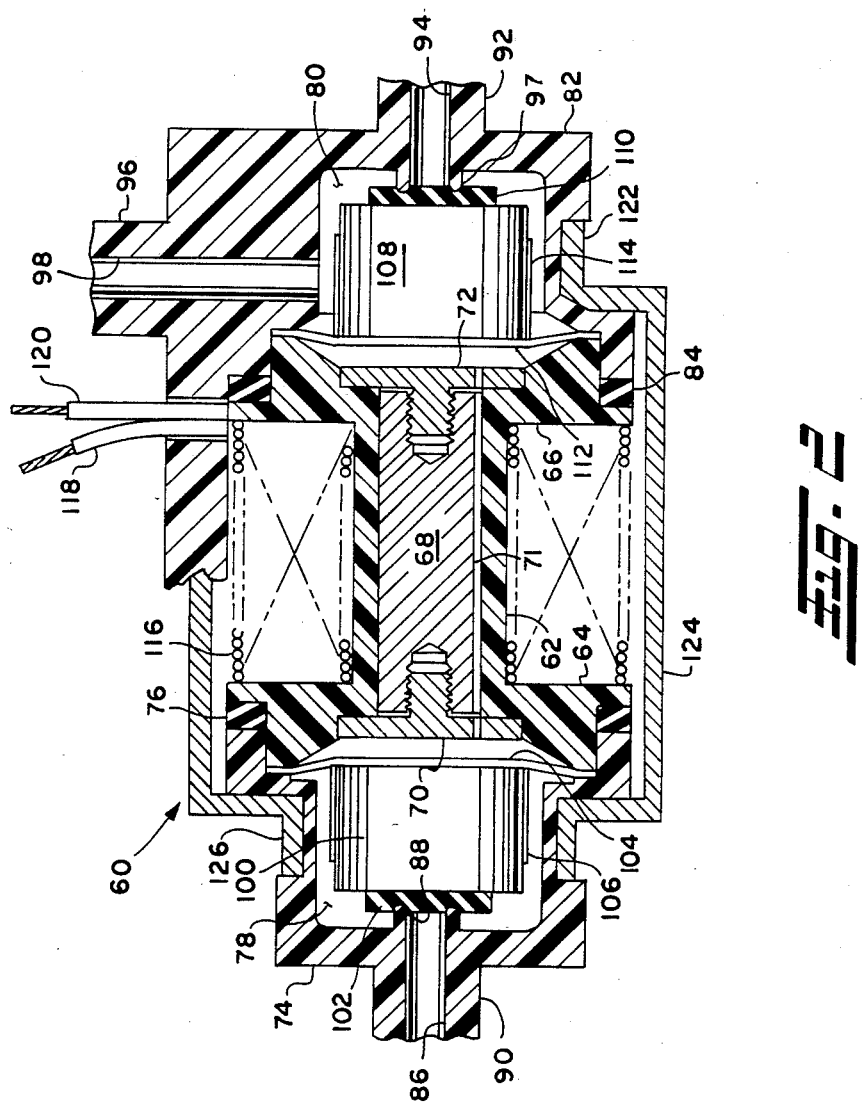

Referring now to FIG. 2, an alternate embodiment of the invention, indicated generally at 60, has a coil bobbin 62 preferably formed of plastic having end flanges 64, 66 with a ferromagnetic core 68 received therein and retained by end pole plates 70, 72 having portions thereof threadedly engaging the core 68 for retaining the core in the center of the bobbin. The assembly of the bobbin 62, core 68 and pole plates 70, 72 has sufficient clearance therethrough as for example by core passage 71 to permit passage of air from one end of the bobbin to another.

An end cap 74 is received over the left end of the bobbin flange 64 and has right-hand axial face of the rim thereof sealed against the axial face of the bobbin flange periphery by a suitable gasket 76 such that the end cap 74 defines a valving cavity 78 between the cap and the bobbin flange. The cavity 78 communicates via the air passage 71 through the bobbin with a corresponding valving cavity 80 formed about the righthand end face of the bobbin flange 66 by cap 82 having the axial face of the periphery thereof sealed against the bobbin flange 66 by a suitable gasket 84.

End cap 74 has a fluid pressure passage 86 provided therethrough which ports into cavity 78 in the form of an annular valve seat 88. Passage 86 is formed in a portion of cap 78 comprising a connector portion 90 adapted for connection to a vacuum hose.

Similarly, cap 82 has a connector portion 92 extending rightwardly therefrom and having a passage 94 formed through connector 92 which is adapted for connection to a vacuum hose. The passage 94 ports into the valving chamber 80 by an annular valve seat 96 formed on the inside surface of the cap 82. Cap 82 also has the signal output connector 96 formed thereon having a passage 98 formed therethrough which ports into valving chamber 80.

A movable armature 100 is received in valving cavity 78 and has attached thereto a valve member in a form of resilient pad 102, preferably formed of elastomeric material, for contacting valve seat 88. The armature 100 is biased in a leftward direction in FIG. 2 by a suitable flat spring 104 disposed between the armature and the core pole 70. Spring 104 has guide portions 106 provided thereon for maintaining the armature centered about the valve seat 88.

Similarly, an armature 108 is disposed in valving chamber 80 and has attached to the righthand face thereof a valve member 110, preferably formed of an elastomeric material, for sealing against valve seat 97. A suitable flat spring 112 biases the armature 108 rightwardly for effecting contact of valve member 110 with valve seat 97. In the presently preferred practice, flat spring 112 has integral guide portions 114 provided thereon for centering armature 108 about valve seat 97.

The armatures 100, 108 each comprise a separate permanent magnet polarized axially with respect to core 68 and having like poles disposed adjacent the respective core poles 70, 72.

A coil 116 of suitable electrical conductor is wound about bobbin 62 and has leads 118, 120 extending through an aperture provided in the wall of an extended portion of end cap 82 for external electrical energization of coil 116.

In the embodiment of FIG. 2, a pole frame or shell 124 formed of ferromagnetic material is disposed about the coil and has the ends thereof terminating adjacent the periphery of the armatures 100, 108 for completing a magnetic loop between the armatures for increasing the magnetic flux and hence the magnetomotive force. In the presently preferred practice, the embodiment of FIG. 2 has the end caps 74, 82 retained respectively against gaskets 76, 84 by end flanges 126, 122 provided on pole frame 124.

It will be understood that the operation of the embodiment of FIG. 2, is otherwise the same as that described above with respect to the embodiment of FIG. 1 and further description thereof has been omitted herein for the sake of brevity.

The present invention thus provides a unique electrically operated vacuum control valve for providing a variable fluid pressure, and particularly a vacuum, control signal in response to a modulated electrical control signal. The valve of the present invention employs a single electrical coil responsive to a series of current pulses of a given polarity for alternately opening either a vacuum or vent valve poppet, depending on current polarity, while maintaining the other poppet in the closed position to prevent atmospheric vent bleed through the valving chamber to the vacuum source. The valve of the present invention thus provides a no-flow single coil electrically operated fluid pressure control signal valve for application in systems requiring a varying fluid pressure control signal for servoactuator operation.

It will be understood by those skilled in the art that the invention has been hereinabove described in the presently preferred practice as a vacuum valve and that modifications and variations of the invention may be made as for example positive fluid pressure valving, and the invention is limited only by the following claims.

What is claimed is:

1. An electromechanical fluid pressure signal control valve comprising:
   (a) housing means defining there within a fluid valving chamber having a fluid flow inlet port, an outlet port and a fluid signal port communicating therewith, said housing means including means defining a valve seat about each of said inlet and outlet port;
   (b) electrical coil means, said coil means having a stationary ferromagnetic core;
   (c) inlet poppet means disposed for movement with respect to said inlet valve seat and outlet poppet means disposed adjacent said outlet valve seat, with said inlet and outlet poppet means each comprising a permanent magnet polarized in the direction of poppet movement with said inlet poppet means disposed adjacent one axial end of said coil means and said outlet poppet means disposed adjacent the opposite end of said coil means;
   (d) means biasing each of said poppet means toward their respective valve seats, said biasing means comprising a spring having one end engaging said poppet means and the other end received over the adjacent end of said core, wherein upon electrical current of a given polarity flowing in said coil means, the axial ends of said core are magnetically oppositely polarized and one of said inlet or outlet poppets is seated against the respective adjacent valve seat by the summed forces of said bias plus the magnetomotive repulsion force generated by said current flow, and the other of said poppet means is moved away from the respective adjacent valve seat by magnetomotive attraction forces overcoming the force of said bias means and is magnetically latched to said core so long as said current flows and upon cessation of said current flow said moved poppet means is unlatched and reseated against said valve seat by said bias means; and,
   (e) electrical lead means received through the wall of said chamber and adapted for connection of said coil to an external source of electrical power.

2. The valve defined in claim 1, wherein
   (a) said inlet and outlet ports are axially aligned at opposite ends of said coil; and,
   (b) said fluid signal port is disposed in said valving chamber axially intermediate said inlet and outlet port.

3. The valve defined in claim 1, wherein, (a) said housing means comprises a first unitary main portion defining said chamber, said inlet port, said inlet valve seat, and said signal port; and, (b) a cap portion defining said outlet port, and said outlet valve seat and including an outlet connector formed integrally therewith having a passage therethrough communicating with said outlet port, said outlet connector being adapted for vacuum hose connection thereto, said cap portion being joined to said main portion about a parting line in fluid pressure sealing relationship.

4. The valve defined in claim 1, wherein, (a) said inlet and outlet valve seats are axially aligned and disposed adjacent opposite ends of said coil means; and, (b) said housing means comprises, (i) a main portion having said chamber, said inlet port and said signal port formed therein and includes a connector having a passage therethrough to said signal port, said connector adapted for connection to a fluid pressure signal hose, (ii) a cap portion defining said fluid pressure outlet port and an outlet connector for hose connection thereto, said cap portion received on said main portion and sealed about a parting line therebetween.

5. An electrically operated vacuum valve comprising:

(a) housing means defining a valving cavity having an inlet port defining an inlet valve seat in one end, an outlet port defining an outlet valve seat in the other end, and a signal outlet port intermediate said inlet and outlet ports;

(b) an inlet and an outlet valve poppet each slidably disposed in said cavity for movement with respect to the corresponding one of said valve seats, said poppets each comprising a permanent magnet polarized in the direction of movement and defining with the wall of said cavity, a fluid passage around said poppet means;

(c) electrical coil means disposed in said valving chamber intermediate said inlet and outlet, said coil having a stationary core of ferromagnetic material with the opposite ends thereof each disposed adjacent respectively one of said poppets;

(d) bias means operable to apply a force urging said inlet and outlet poppets toward respectively the inlet and outlet valve seats; and, (e) lead means connected to said coil and received through said housing, said lead means adapted for connection to a source of electrical power, wherein upon said coil experiencing electrical current flow therethrough, said coil core has the ends thereof polarized magnetically oppositely and the resultant magnetomotive repulsion force generated at one end of said core sums with the force of said bias means in urging one of said poppet means against the respective adjacent valve seat and the magnetomotive attraction force generated at the opposite end of said core sums with the magnetic force of the other of said permanent magnet poppets and overcomes the force of said bias means and moves said other valve poppet away from the respective adjacent valve seat for magnetic latching against said core, and upon cessation of said current flow in said coil means said bias means is operative to urge both of said valve poppets into sealing contact with their respective adjacent valve seats thereby closing said valving chamber to said inlet and outlet ports.

* * * * *